United States Patent
Luo et al.

(10) Patent No.: US 12,516,618 B2
(45) Date of Patent: Jan. 6, 2026

(54) APPARATUS, METHODS AND SYSTEMS FOR ELECTRICALLY HEATED PARTICULATE FILTER AND SCR CATALYST IN VEHICLES

(71) Applicant: Cummins Inc., Columbus, IN (US)

(72) Inventors: Jinyong Luo, Columbus, IN (US); Xiaobo Song, Columbus, IN (US); Colin L. Norris, Columbus, IN (US); Xing Jin, Elmhurst, IL (US); Matthew L. Anderson, Columbus, IN (US); Ying Yuan, Rexford, NY (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/235,212

(22) Filed: Aug. 17, 2023

(65) Prior Publication Data
US 2023/0392529 A1    Dec. 7, 2023

Related U.S. Application Data

(62) Division of application No. 17/090,279, filed on Nov. 5, 2020, now Pat. No. 11,773,761.

(51) Int. Cl.
*F01N 9/00* (2006.01)
*F01N 3/20* (2006.01)

(52) U.S. Cl.
CPC ......... *F01N 3/2013* (2013.01); *F01N 3/2066* (2013.01); *F01N 2900/104* (2013.01);
(Continued)

(58) Field of Classification Search
CPC .. F01N 3/2013; F01N 3/2026; F01N 2240/16; F01N 2900/104
See application file for complete search history.

(56) References Cited

U.S. PATENT DOCUMENTS 5,517,848 A * 5/1996 Hosoya ............... F02D 35/0038
                                                        73/23.31
8,413,423 B2    4/2013 Roos et al.
(Continued)

FOREIGN PATENT DOCUMENTS

DE    102018107743 A1 * 10/2018 ............. F01N 3/103
EP    2963261 A1    1/2016
(Continued)

OTHER PUBLICATIONS

European Search Report for EP Patent Application No. 21198733.4, Issued on Feb. 16, 2022, 8 pages.
(Continued)

*Primary Examiner* — Jonathan R Matthias
(74) *Attorney, Agent, or Firm* — Faegre Drinker Biddle & Reath LLP

(57) ABSTRACT

The enclosed disclosure relates to vehicle systems in which an engine, a particulate filter fluidly coupled with the engine, a selective catalytic reduction (SCR) system fluidly coupled with the engine downstream of the particulate filter, an electrical heating device implemented with the particulate filter, and a controller operatively coupled with the engine and the electrical heating device, are implemented. The controller can detect, when the engine is turned off, a condition for turning on the engine, detect a temperature of the particulate filter of the SCR system, activate the electrical heating device in response to the detected temperature being below a lower temperature threshold, and turn on the engine in response to the detected temperature being at or above the lower temperature threshold.

20 Claims, 5 Drawing Sheets

(52) U.S. Cl.
CPC ............... *F01N 2900/1404* (2013.01); *F01N 2900/1411* (2013.01); *F01N 2900/1602* (2013.01)

(56) References Cited

U.S. PATENT DOCUMENTS

| | | | |
|---|---|---|---|
| 8,904,767 | B2 | 12/2014 | Andersson et al. |
| 9,062,584 | B2 | 6/2015 | Zhang et al. |
| 10,408,103 | B1 | 9/2019 | Miao et al. |
| 11,773,761 | B2 | 10/2023 | Luo et al. |
| 2008/0282673 | A1* | 11/2008 | Gonze ............ B60K 6/445 60/284 |
| 2011/0047981 | A1* | 3/2011 | Roos ............ F01N 13/0097 60/300 |
| 2012/0167554 | A1 | 7/2012 | Zhang et al. |
| 2012/0292974 | A1 | 11/2012 | Cassaday |
| 2017/0145886 | A1* | 5/2017 | Crawford ............ H05B 6/365 |
| 2018/0266349 | A1* | 9/2018 | Almkvist ............ F01N 13/009 |
| 2020/0102925 | A1* | 4/2020 | Christl ............ F01N 3/025 |
| 2020/0182118 | A1 | 6/2020 | Yokoi |
| 2020/0232370 | A1 | 7/2020 | Hirooka et al. |
| 2020/0298701 | A1 | 9/2020 | Meier et al. |
| 2022/0010742 | A1* | 1/2022 | Cox ............ F02N 11/0829 |
| 2022/0136421 | A1 | 5/2022 | Luo et al. |

FOREIGN PATENT DOCUMENTS

| | | | | |
|---|---|---|---|---|
| FR | 3004755 | A1 * | 10/2014 | ............ B01F 15/066 |
| WO | 2012/092974 | A1 | 7/2012 | |

OTHER PUBLICATIONS

GreenTrap Volt-Series Active Diesel Particulate Filter (ADPF) Features, downloaded from the Internet at http://www.jmdpf.com/diesel-particulate-filter-exhaust-system-electrical-johnson-matthey, Nov. 5, 2020; 7 pages.

Johnson Matthey, Electrical (DPFI), downloaded from the Internet at http://www.jmdpf.com/diesel-particulate-filter-exhaust-system-electrical-johnson-matthey, Nov. 5, 2020; 3 pages.

Machine translation of FR-3004755-A1, accessed Oct. 6, 2022. (Year: 2022).

Reed, Trevor, "Patent Trolling: Next-Gen Diesel Particulate Filter Technology," dated Jun. 16, 2014, downloaded from the Internet at http://www.trucktrend.com/features/1407-patent-trolling-next-gen-diesel-particulate-filter-technology/; 29 pages.

Ward Clean Air Products, Active Diesel Particulate Filters (DPF), downloaded from the Internet at http://wardcleanairproducts.com/products/active-diesel-particulate-filters-dpf/, Nov. 5, 2020; 5 pages.

Examination report for EP 21198733.4, mailed Nov. 26, 2024.

* cited by examiner

100

100

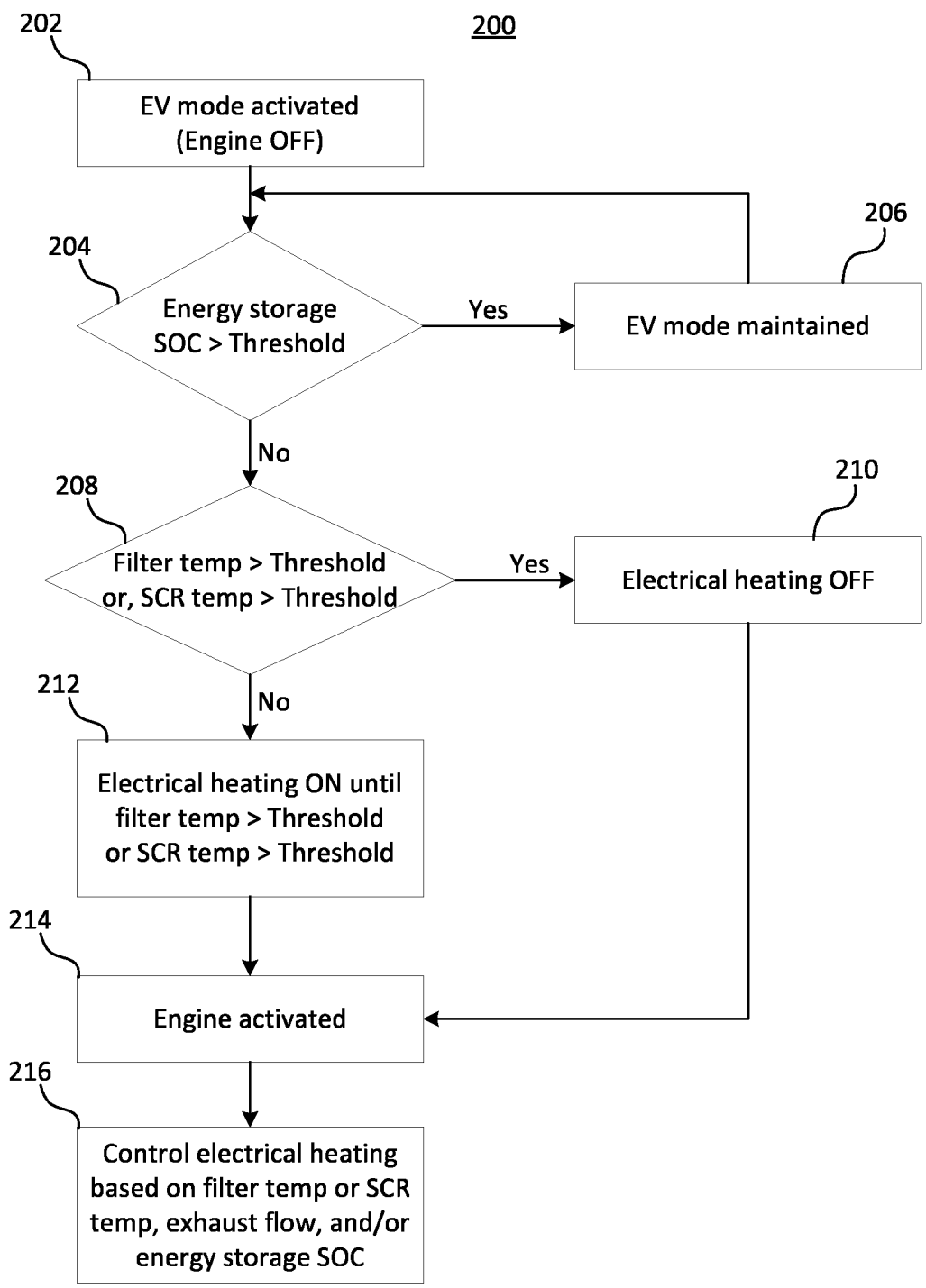

APPARATUS, METHODS AND SYSTEMS FOR ELECTRICALLY HEATED PARTICULATE FILTER AND SCR CATALYST IN VEHICLES

CROSS-REFERENCE TO RELATED APPLICATIONS

This application claims priority to and is a divisional application of U.S. Ser. No. 17/090,279, filed Nov. 5, 2020, the entire content of which is expressly incorporated herein by its reference.

FIELD OF THE DISCLOSURE

The present disclosure relates generally to engine systems and more specifically to engine systems with aftertreatment systems that are heated to reduce NOx emissions.

BACKGROUND OF THE DISCLOSURE

A vehicle which uses a fuel-powered engine such as an internal combustion engine produces unwanted by-products or emissions as a result of the combustion process, such as NOx. An aftertreatment system is used to ensure that the engine meets the emission regulations. Selective Catalytic Reduction (SCR) systems have been implemented in vehicles with diesel engines to reduce NOx. However, SCR systems generally need to be above a certain temperature to properly reduce emissions. Hybrid power train systems improve the fuel economy of the system, in part, by allowing the engine to shut down during certain operating periods where a torque contribution from the engine is not needed. During an engine shut down, exhaust gases are not flowing through the SCR system, and the SCR system begins to cool toward an ambient temperature. As the SCR system cools and becomes less efficient, undesirable emissions may result. Accordingly, further contributions are needed in this area of technology.

SUMMARY OF THE DISCLOSURE

According to the present disclosure, vehicle systems are disclosed in which an engine, a particulate filter fluidly coupled with the engine, a selective catalytic reduction (SCR) system fluidly coupled with the engine downstream of the particulate filter, an electrical heating device implemented with the particulate filter, and a controller operatively coupled with the engine and the electrical heating device are implemented. The controller can detect, when the engine is turned off, a condition for turning on the engine, detect a temperature of the particulate filter of the SCR system, activate the electrical heating device in response to the detected temperature being below a lower temperature threshold, and turn on the engine in response to the detected temperature being at or above the lower temperature threshold.

In some examples, the electrical heating device and the particulate filter are implemented in a common housing. In some examples, the controller can deactivate, after the engine is turned on, the electrical heating device in response to detecting the temperature of the particulate filter of the SCR system being above an upper temperature threshold. In some examples, the controller can control the electrical heating device based on exhaust flow rate and exhaust temperature from the engine. The controller can do so by activating the electrical heating device at a higher power setting in response to detecting the exhaust flow rate is below a flow rate threshold and the exhaust temperature is below the lower temperature threshold.

In some examples, the vehicle system also includes an electric machine operatively coupled with the controller and an energy storage device coupled with the electric machine. The controller can use the electric machine to power the vehicle when the engine is turned off. The condition for turning on the engine includes detecting a state of charge (SOC) of the energy storage device being below a lower SOC threshold. In some examples, the controller can control the electrical heating device based on the SOC of the energy storage device.

Also disclosed herein are vehicle systems with an engine, a selective catalytic reduction (SCR) system fluidly coupled with the engine, an electrical heating device implemented with the SCR system, and a controller operatively coupled with the engine and the electrical heating device. The controller can detect, when the engine is turned off, a condition for turning on the engine, detect a temperature of the SCR system, activate the electrical heating device in response to the detected temperature being below a lower temperature threshold, and turn on the engine in response to the detected temperature being at or above the lower temperature threshold.

In some examples, the electrical heating device and the SCR system are implemented in a common housing. In some examples, the controller can deactivate, after the engine is turned on, the electrical heating device in response to detecting the temperature of the SCR system being above an upper temperature threshold. In some examples, the controller can control the electrical heating device based on exhaust flow rate and exhaust temperature from the engine. The controller can do so by activating the electrical heating device at a higher power setting in response to detecting the exhaust flow rate is below a flow rate threshold and the exhaust temperature is below the lower temperature threshold.

In some examples, the vehicle system includes an electric machine operatively coupled with the controller and an energy storage device coupled with the electric machine. The controller can use the electric machine to power the vehicle when the engine is turned off. The condition for turning on the engine includes detecting a state of charge (SOC) of the energy storage device being below a lower SOC threshold. In some examples, the controller can control the electrical heating device based on the SOC of the energy storage device.

Also disclosed herein are methods of operating a vehicle system. The method includes detecting, by a controller of the vehicle system, a condition for turning on an engine of the vehicle system, detecting, by the controller, a temperature of a particulate filter or a selective catalytic reduction (SCR) system, wherein the particulate filter is fluidly coupled with the engine and the SCR system is fluidly coupled with the engine downstream of the particulate filter, activating, by the controller, an electrical heating device implemented with the particulate filter in response to the detected temperature being below a lower temperature threshold, and turning on, by the controller, the engine in response to the detected temperature being at or above the lower temperature threshold.

In some examples, the method also includes deactivating, by the controller after the engine is turned on, the electrical heating device in response to detecting the temperature of the particulate filter of the SCR system being above an upper temperature threshold. In some examples, the method also includes controlling, by the controller, the electrical heating device based on exhaust flow rate and exhaust temperature from the engine. In some examples, the method also includes detecting, by the controller, the exhaust flow rate being below a flow rate threshold and the exhaust temperature is below the lower temperature threshold, and activating, by the controller, the electrical heating device at a higher power setting. In some examples, the method also includes using, by the controller, an electric machine operatively coupled with the controller to power the vehicle when the engine is turned off, such that the condition for turning on the engine includes detecting a state of charge (SOC) of an energy storage device coupled with the electric machine being below a lower SOC threshold. In some examples, the method includes controlling, by the controller, the electrical heating device based on the SOC of the energy storage device.

Also disclosed herein are methods of operating a vehicle system. The method includes detecting, by a controller of the vehicle system, a condition for turning on an engine of the vehicle system, detecting, by the controller, a temperature of a selective catalytic reduction (SCR) system, wherein the SCR system is fluidly coupled with the engine, activating, by the controller, an electrical heating device implemented with the SCR system in response to the detected temperature being below a lower temperature threshold, and turning on, by the controller, the engine in response to the detected temperature being at or above the lower temperature threshold.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The detailed description of drawings particularly refers to the accompanying figures in which:

FIG. 2 shows a flowchart of a process of operating a vehicle as disclosed herein;

DETAILED DESCRIPTION

The embodiments of the disclosure described herein are not intended to be exhaustive or to limit the disclosure to the precise forms disclosed. Rather, the embodiments selected for description have been chosen to enable one skilled in the art to practice the disclosure.

Figure 1A:
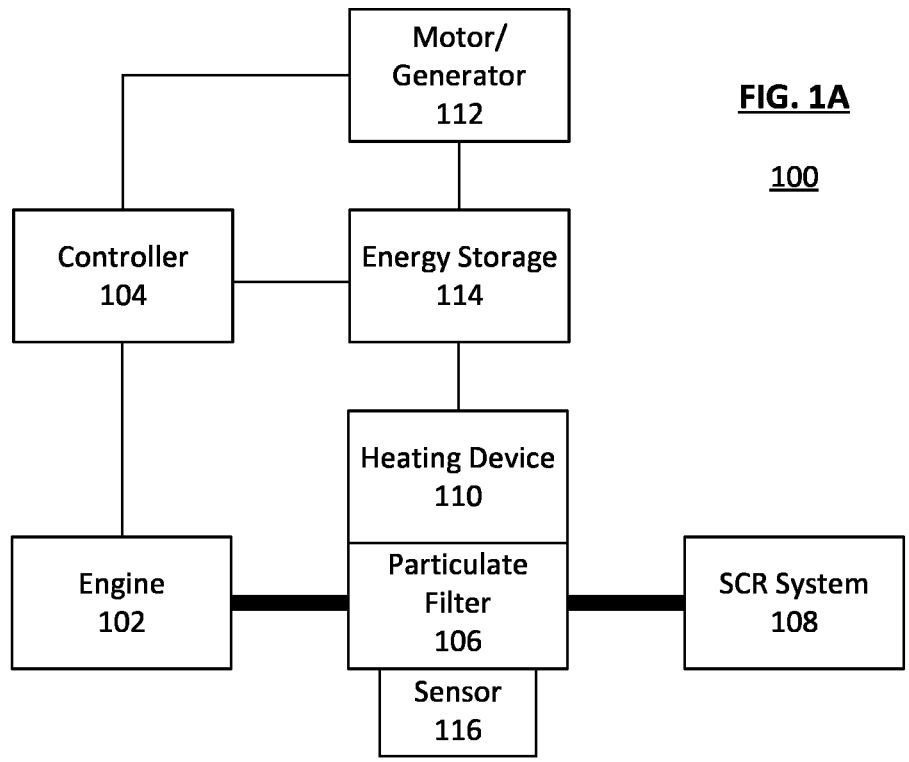
FIGS. 1A and 1B show a schematic diagram of a hybrid vehicle system according to an embodiment disclosed herein.
Figure 1B:
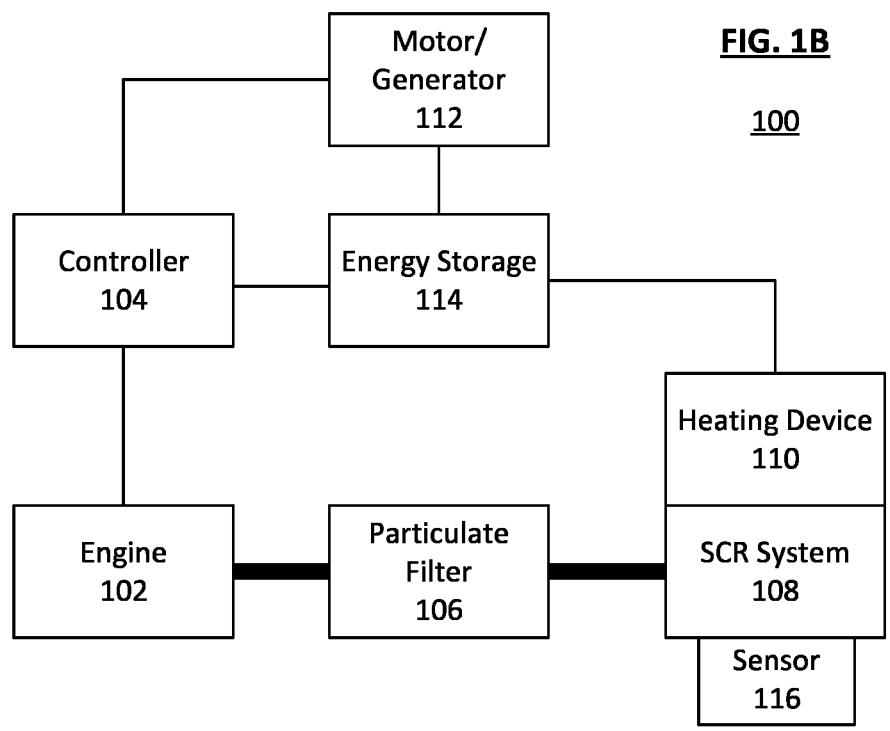

Referring to FIGS. 1A and 1B, a hybrid vehicle system 100 is shown, which includes both an engine 102, such as a diesel engine or internal combustion engine (or ICE), and an electric machine 112 which may be a motor and/or a generator (e.g., motor-generator, or MG). The engine 102 is fluidly coupled with particulate filter(s) 106 and a Selective Catalytic Reduction (or SCR) system 108. Although not shown, in some examples, the engine 102 is also fluidly coupled with diesel oxidation catalysts (DOC) upstream of the particulate filter 106, which may be a diesel particulate filter (DPF). Each fluid connection is represented with a thick black line, which may be implemented using pipes. The thin black lines represent electrical connections such as via wires or a communication bus. The system 100 includes a controller 104 that is electrically coupled with both the engine 102 and the motor/generator 112, as well as an energy storage device 114, which may be one or more battery of any suitable type. The energy storage device 114 is electrically coupled with the motor/generator 112 and also to a heating device 110. In some examples, the heating device 110 is powered by the energy storage device 114, and the heating device 110 includes a switch which is activated by the controller 104 to turn on/off the heating device 110. The hybrid vehicle system 100 may have a parallel, series, or series/parallel architecture, as suitable. There may also be range extender and/or strong hybrid applications.

The controller 104 may be any suitable data processing device and may include a processor, a CPU, a microcontroller, or any other suitable electronic device known in the art. A memory storage device may be implemented to store data related to the vehicle system 100. The particulate filter 106 may be any suitable filter including but not limited to partial or flow-through filters and high-efficiency wall-flow filters, e.g. diesel particulate filters, diesel oxidation catalyst filters, or SCR on Filter. Other examples include but are not limited to cordierite wall-flow filters, silicon carbide wall-flow filters, ceramic fiber filters, metal fiber flow-through filters, or paper cores, to name a few. The SCR system 108 may be any suitable system which includes a catalyst and a reductant doser. The reductant may be any reductant understood in the art, including urea, ammonia, and/or a hydrocarbon. The catalyst may include one or more catalyst bricks. In FIG. 1A, the heating device 110 is implemented in the filter 106, whereas in FIG. 1B, the heating device 110 is implemented in the SCR system 108.

In hybrid applications such as the ones shown in FIGS. 1A and 1B, cold-start NOx is considered a potential major source of NOx emission, so a quick warmup of the filter 106 and/or the SCR system 108 is preferred. In prior examples known in the art, fast SCR warmup is delayed partially due to large thermal inertia of the upstream particulate filter. As more hybrid vehicles implement cold-start operation, such as after an extended electric-vehicle (EV) mode or engine stop/start, cold-start NOx could become a major source of NOx emission, such as in plug-in range extender applications. Therefore, in some examples, large thermal inertia of the particulate filter prevents fast aftertreatment response, especially SCR warmup. In such cases, either an exhaust heater or electrically heated catalysts (EHC) could be used to raise the catalyst temperature.

Specifically, the EHC heats the catalysts by first warming up the particulate filter and taking advantage of the thermal inertia of the particulate filter to store the heat energy during an engine-off period. Then, the stored heat energy is released to the exhaust during an engine-on event when the engine is activated. The heat energy is then transferred to the SCR catalyst in the SCR system for NOx reduction. However, an exhaust heater has a limitation compared to the EHC because the heat generated by the exhaust heater needs to be carried via gas transfer, i.e. the moving of gas from one place to another allows the heat to be carried to an intended destination. The EHC application does not require the exhaust gas to carry the heat to the destination because the heating device 110 allows the heat to be stored in the particulate filter before the engine is activated, or alternatively installed at the destination, i.e. the SCR system. The particulate filter includes, in some examples, traditional diesel particulate filter, DOC-on-DPF (combined implementation of DOC and DPF), or SCR-on-filter (SCR-F), etc. The heating device 110 may be electrically activated during the EV mode or a period of time in which the vehicle is stopped.

Emission control catalysts are typically manufactured by applying washcoat onto catalyst supports. The washcoat serves as the carrier for a precious metal catalyst and may be a porous refractory oxide layer which is applied to the substrates from an acidified aqueous slurry, dried and calcined. Aluminum oxide is the most common washcoat material. Other materials, used either as catalyst carriers or as promoters and stabilizers, include but are not limited to silicon oxide, cerium dioxide, titanium dioxide, zirconium oxide, and zeolites.

In FIG. 1A, the electrical heating device 110 and the filter 106 are implemented together in a common housing such that the heating device 110 and the filter 106 are considered a singular component, i.e. not separated by a pipe or other components which may be used to fluidly connect the engine 102, the filter 106, and the SCR system 108 together. In some examples, during the EV mode or stop period of the vehicle, the heating device 110 is turned on by the controller 104. The heat energy from the heating device 110 is stored on the filter 106 with large thermal inertia, such that the filter 106 is prepared for when the engine 102 is turned on next. When the engine 102 is turned on or activated, the heat in the filter 106 is carried out by exhaust from the engine 102 to the SCR system 108 downstream, resulting in NOx reduction.

In FIG. 1B, the electrical heating device 110 and the SCR system 108 are implemented together in a common housing so as to be considered a singular component. In some examples, during the EV mode or stop period of the vehicle, the heating device 110 is turned on by the controller 104. The heat energy from the heating device 110 is stored on the SCR system 108 such that the SCR system 108 is prepared for when the engine 102 is turned on next. When the engine 102 is turned on or activated, the heat in the SCR system 108 reduces NOx emission by heating the catalyst to at least a predetermined temperature.

In some examples, the electrical heating device 110 is controlled at least partially based on one or more features measured by one or more sensor 116 implemented in the system. In FIGS. 1A and 1B, the sensor 116 shown may be a thermometer which measures the temperature of the filter 106 in FIG. 1A or of the SCR system 108 in FIG. 1B. Other sensors may also be implemented in different components, such as a sensor at the energy storage device 114 to measure the remaining state-of-charge (SOC) or a sensor at the engine 102 to measure the soot level. Additional sensors may be installed as suitable to monitor parameters such as aftertreatment temperature, exhaust flow, etc. In some examples, the exhaust flow rate from the engine 102 is used as an indicator that the heating device 110 needs to be activated at a lower or higher power setting. When there is low exhaust flow rate and low exhaust temperature (that is, the exhaust flow rate is below a threshold flow rate and the exhaust temperature is below a temperature threshold), the heating device 110 needs to be activated at higher power to accommodate for the lack of flow from the engine 102 to carry the heat from the engine 102 to the particulate filter 106, for example. In another examples, the heating device could be activated at different power levels, based on physical modelling which incorporates exhaust flow, exhaust temperature and catalyst component temperatures, to ensure fast aftertreatment system warm-up and keep the aftertreatment warm afterwards when engine is turned on or activated.

In some examples, there may be additional heating device(s) 110 in the system 100 such that one or more heating device is implemented in both the particulate filter 106 and the SCR system 108. In such examples, both the particulate filter 106 and the SCR system 108 may be heated simultaneously with or independently from each other, as deemed suitable by the controller 104. A different threshold temperature may be determined for each component, as suitable.

FIG. 2 illustrates a process or method 200 by which the controller determines how to operate the hybrid vehicle according to some examples. The process 200 begins with the engine turned off and the motor turned on when the EV mode is activated; step 202. The controller determines if the SOC of the energy storage device such as a battery is greater than a predetermined threshold level; step 204. If the SOC is sufficiently high, e.g. higher than the threshold, the EV mode is maintained; step 206. Otherwise, the controller determines if (1) the filter temperature is greater than a predetermined threshold level or (2) the SCR temperature is greater than a predetermined threshold level; step 208. In an embodiment which uses the heating device implemented with the particulate filter such as shown in FIG. 1A, the controller takes into account the (1) filter temperature, but in an embodiment which uses the heating device implemented with the SCR system such as shown in FIG. 1B, the controller takes into account the (2) SCR temperature instead.

In some examples, the step 204 is replaced with a step in which the controller detects a predetermined condition which would necessitate the activation of the engine. For example, the condition may be that the SOC of the energy storage device is low, as explained above, or there may be an increase in the vehicle's power demand which may not be met with the EV mode. In some examples, the predetermined condition is determined using a predictive algorithm such as a position reckoning system (such as GPS) working in conjunction with a motion tracking system to predict when the vehicle will experience an increase in power demand based on the terrain or inclines along a predicted route of the vehicle. In some examples, the controller has access to a cloud network which transmits lookahead information regarding the possible routes of the vehicle such as the weather, temperature, road condition, road grade, detours, etc., within a lookahead window. In some examples, the predetermined condition may be based on whether the vehicle is predicted to enter a road which allows the operator to drive at an increased speed such as a highway.

In the aforementioned examples, the predicted condition and vehicle power demand are determined based on the lookahead information obtained within the lookahead window, which can be based on time or distance, which is activated or employed in the process 200 to identify anticipated vehicle load changes or power demand changes. Such embodiments provide for operating condition and route terrain data to be dynamically acquired in real-time through "foresight" or lookahead windows of a discrete distance.

In some examples, the lookahead information is obtained via the Internet or the cloud network. The controller of the vehicle can access wirelessly obtain such information from a remote database, server, and/or processing unit such as computer or mobile device, through the use of a wireless telematics unit installed on the vehicle, or alternatively on a mobile device within the vehicle that is operatively coupled with the controller. Any suitable optimization procedure may be performed by a processing unit of the controller or by a remote computing device coupled with the controller through the cloud network, for example.

In acquiring operating condition and route terrain data in discrete segments as the vehicle moves through a unit distance, informational data is acquired and the system updated to, amongst other things, correct for deviations from the optimization. The size or distance of the lookahead or trip window can be set at a default interval or adjustable by the operator. The lookahead window size is selected based upon the desired data resolution and speed of processing.

When the controller determines that the temperature as measured in step 208 does not reach the threshold value (a lower temperature threshold value), the controller turns on the electrical heating until the temperature of (1) the filter or (2) the SCR reaches or surpasses the threshold value; step 212. The engine is activated afterward; step 214. Alternatively, when the controller determines that the measured temperature in step 208 is greater than the threshold value (a higher temperature threshold value), the controller turns off the electrical heating or allow it to remain turned off; step 210. Thereafter, the engine is activated as per step 214 without needing to activate the electrical heating, since the filter temperature or the SCR temperature, whichever is more pertinent according to the design of the electric vehicle, is already at or above the threshold value required for the component to reach in order to achieve minimal NOx emission.

After step 214, according to some examples, the controller controls the electrical heating based on one or more of the following factors: the filter temperature or SCR temperature, exhaust flow, and/or energy storage SOC; step 216. Furthermore, in some examples, there is an additional step (not shown) after step 216 in which the controller turns off the electrical heating upon detecting that the filter temperature or the SCR temperature is greater than an upper threshold value. The threshold values for turning the electrical heating on or off may vary according to the system architecture and the components used therein. In some examples, the lower threshold value mentioned in step 208 may be approximately 200° C. and the upper threshold value may be approximately 300° C.

As explained above, in FIG. 1A, the heating device 110 and the particulate filter 106 is implemented in the common housing as a single component. The single component may be called an electrically heated particulate filter. The electrically heated particulate filter may be turned on based on the SOC of the battery (e.g. energy storage device 114) which provides power to the motor 112, while the engine 102 remains turned off. Then, when the temperature within the electrically heated particulate filter increases to or above the threshold level, the engine is turned on, allowing the emission therefrom to pass through the filter and into the SCR system 108. In some examples, there may be a thermal coupling in or downstream of the filter for feedback control heater power. That is, the electrically heated filter 106 is thermally coupled with the SCR system 108 such that the thermal energy of the filter 106 is effectively transferred downstream to the SCR system 108. In some examples, a compressor coupled with the engine's belt drive or an electric compressor driven by a motor is implemented to generate a NOx-free flow to warm the SCR system 108 before the engine 102 is turned on.

Figure 3A:
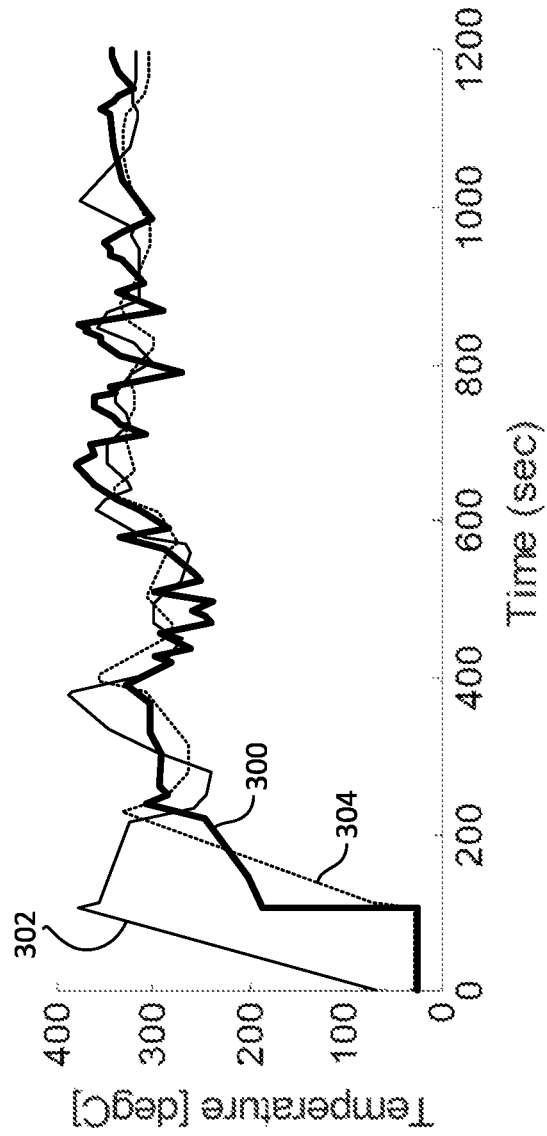
FIG. 3A shows a graph comparing temperature fluctuation of vehicle components using a process according to an embodiment disclosed herein.

FIG. 3A shows a simulation graph of the temperature changes in the filter and the SCR as compared to the turbo-out temperature of the system when an electrically heated particulate filter is implemented (e.g., as shown in FIG. 1A). Turbo-out temperature 300 (thick line), filter temperature 302 (thin line), and SCR temperature 304 (dotted line) are shown. In this example, the heated filter helps the SCR temperature 304 increase immediately after the engine starts in order to mitigate low-temperature NOx reduction. The filter temperature 302 is initially increased while the engine is turned off until reaching a threshold temperature, which in this example is approximately 380° C. at approximately 108 seconds after the filter temperature 302 begins to rise. Thereafter, the engine is allowed to turn on at the 108-second mark defined by the filter temperature 302 reaching the threshold temperature. The turbo-out temperature 300 immediately increases to approximately 200° C. when the engine is turned on, and the exhaust flow carries heat from the filter to the SCR system, causing an increase in the SCR temperature 304 starting at the 108-second mark.

Figure 3B:
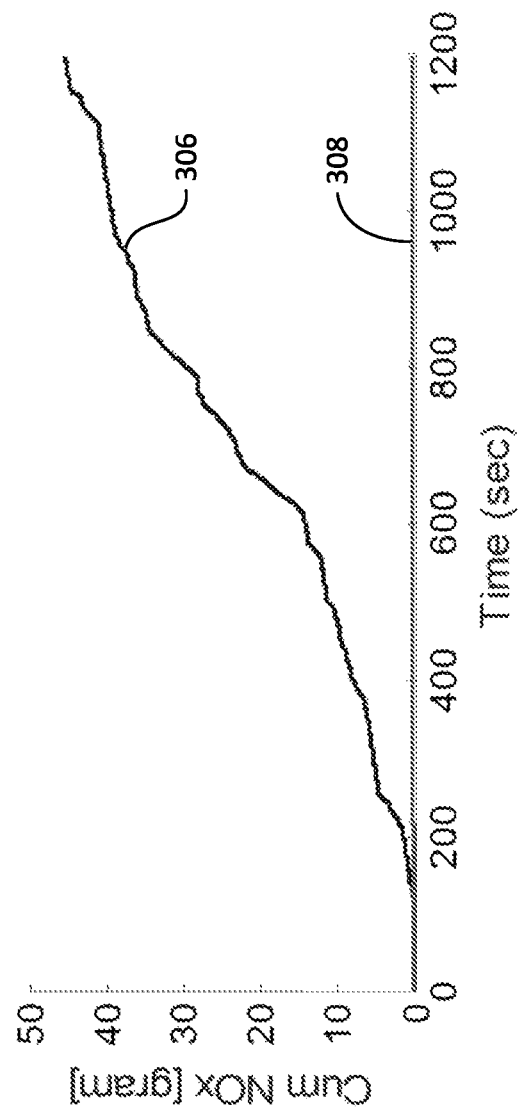
FIG. 3B shows a graph comparing an engine-out NOx (EONOx) emission with a system-out NOx (SONOx) emission using the embodiment of FIG. 3A.

FIG. 3B compares an engine-out NOx (EONOx) emission 306 with a system-out NOx (SONOx) emission 308 resulting from the embodiment of FIG. 3A. The EONOx emission 306 is the NOx emission that is fed into the aftertreatment system, and the SONOx emission 308 is the NOx emission which exits the aftertreatment system. At 1200 seconds, it is calculated that there is a 98.9% reduction in the EONOx emission 306 after it passes through the aftertreatment system, thereby showing that the SONOx emission 308 is 98.9% less than the EONOx emission 306.

Figure 4A:
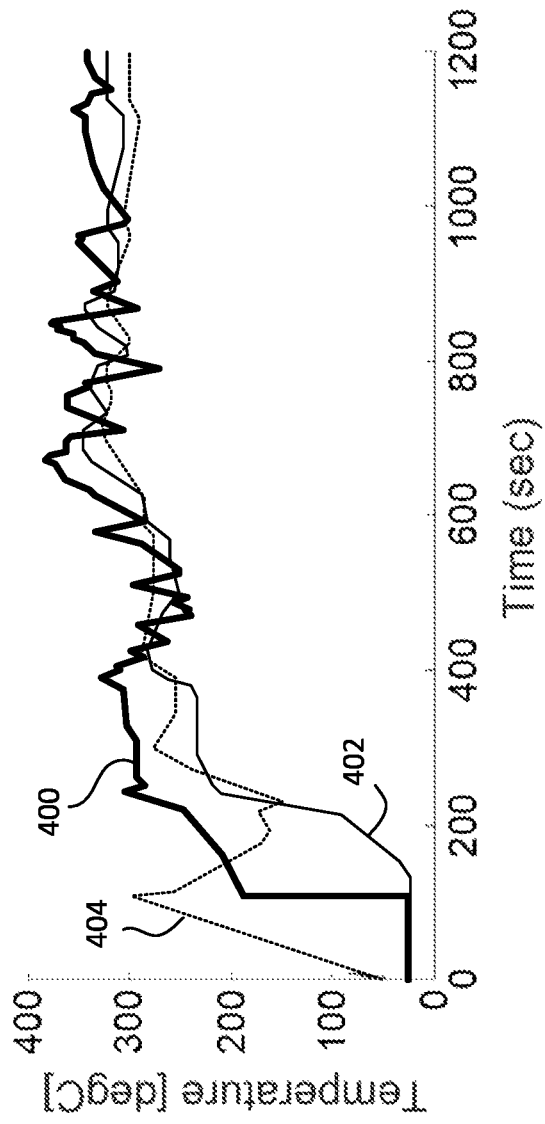
FIG. 4A shows a graph comparing temperature fluctuation of vehicle components using a process according to an embodiment disclosed herein.

FIG. 4A shows a simulation graph of the temperature changes in the filter and the SCR as compared to the turbo-out temperature of the system when an electrically heated SCR system is implemented (e.g., as shown in FIG. 1B). Turbo-out temperature 400 (thick line), filter temperature 402 (thin line), and SCR temperature 404 (dotted line) are shown. In this example, the SCR system is directly and electrically heated to increase the SCR temperature 404 without requiring exhaust or air flow to do so. The SCR system is warmed up to increase the SCR temperature 404 prior to starting the engine using capable hybrid architecture. When the SCR temperature 404 reaches the threshold temperature, which in this example is approximately 300° C. at approximately 108 seconds after the SCR temperature 404 begins to rise, the engine is allowed to turn on at the 108-second mark. The turbo-out temperature 400 immediately increases to approximately 200° C. when the engine is turned on. The SCR temperature 404 is subsequently reduced due to the cold flow from the filter, which at this time still has a low filter temperature 402. Afterwards, the filter temperature 402 increases due to the exhaust, and the SCR temperature 404 increases as well.

Figure 4B:
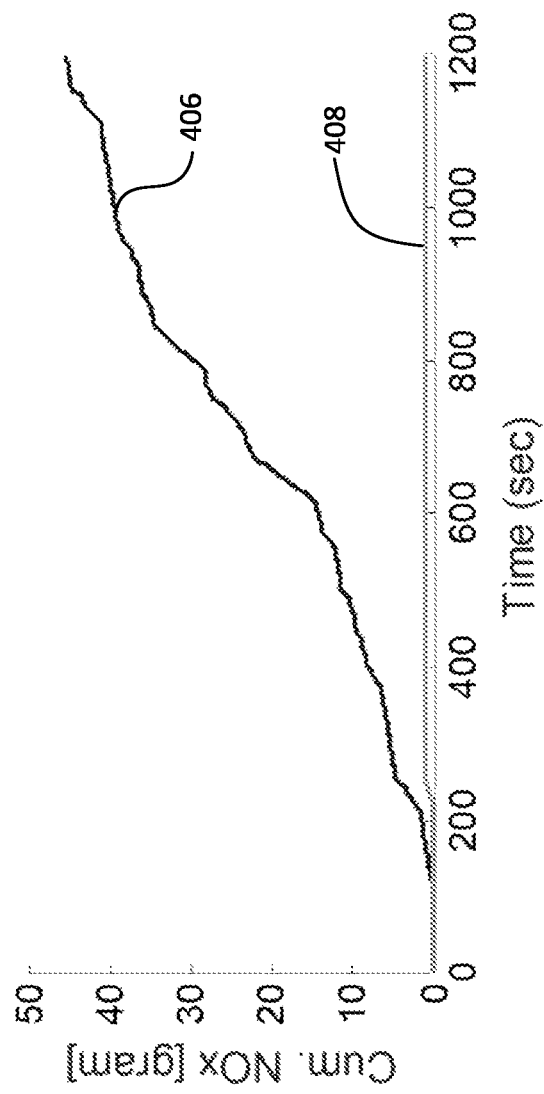
FIG. 4B shows a graph comparing an EONOx emission with SONOx emission using the embodiment of FIG. 4A.

FIG. 4B compares an EONOx emission 406 with a SONOx emission 408 resulting from the embodiment of FIG. 4A. At 1200 seconds, it is calculated that there is a 97.6% reduction in the EONOx emission 306 after it passes through the aftertreatment system, thereby showing that the SONOx emission 308 is 97.6% less than the EONOx emission 306.

Figure 5A:
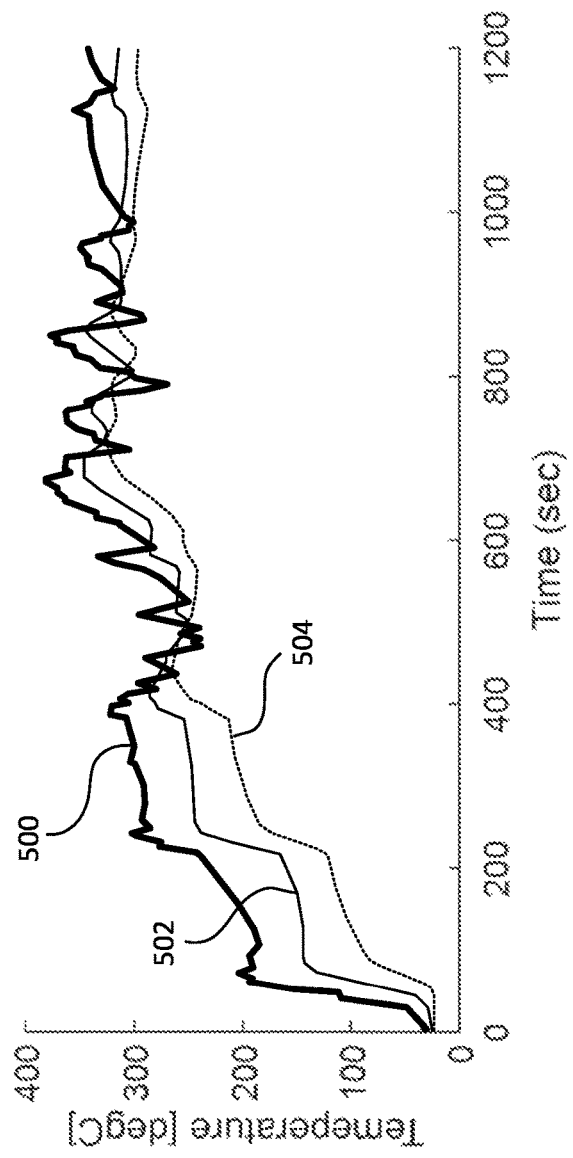
FIG. 5A shows a graph comparing temperature fluctuation of vehicle components using a process and a non-hybrid system as known in the art.

In comparison with FIGS. 3A and 4A is FIG. 5A which shows a simulation graph of the temperature changes in the filter and the SCR as compared to the turbo-out temperature in a non-hybrid vehicle system as known in the art with no electric heater or electric machine (motor) implemented therein. Turbo-out temperature 500 (thick line), filter temperature 502 (thin line), and SCR temperature 504 (dotted line) are shown. The particulate filter is located downstream of the engine, and the SCR system is located downstream of the filter, so the only source of heat is the exhaust from the engine. As such, the turbo-out temperature 500 increases before the filter temperature 502, and the last temperature to increase is the SCR temperature 504. This configuration causes cold-start NOx because the filter and the SCR system are both too cold at the start of engine operation. The effect of the cold-start NOx is shown in FIG. 5B.

Figure 5B:
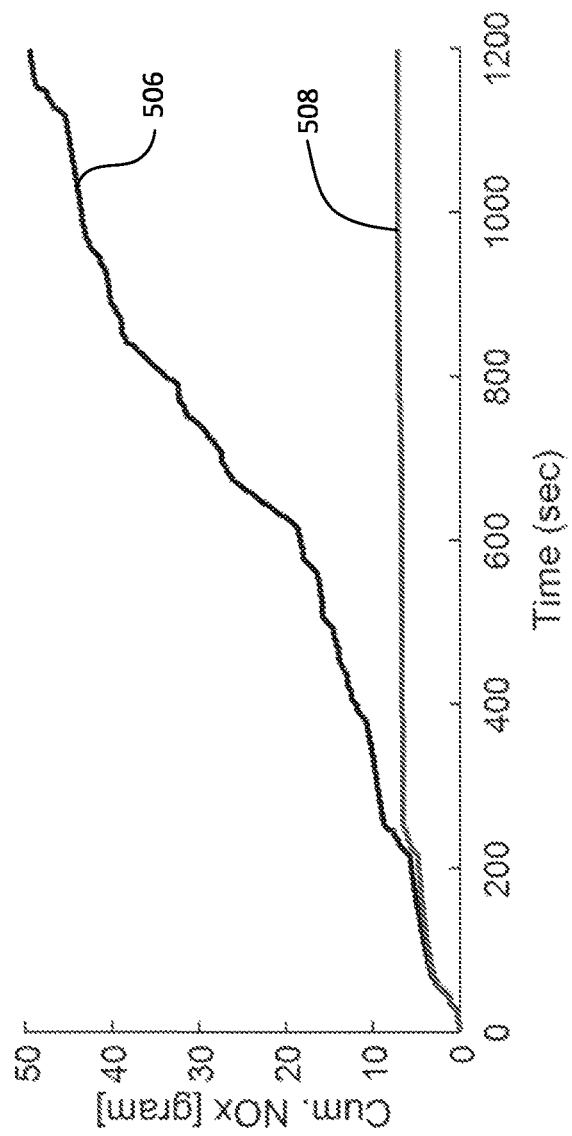
FIG. 5B shows a graph comparing an EONOx emission with SONOx emission using the known system of FIG. 5A.

In comparison with FIGS. 3B and 4B is FIG. 5B which compares an EONOx emission 506 with a SONOx emission 508 in the non-hybrid vehicle system with no electric heater or electric machine, as known in the art. At 1200 seconds, it is calculated that there is a reduction in the EONOx emission 506 after it passes through the aftertreatment system, thereby indicating that the SONOx emission 508 is merely 85.5% less than the EONOx emission 506 in the vehicle system as known in the art. This is caused by the filter and the SCR system being too cold when the engine is turned on, as shown in FIG. 5A, so the NOx reduction shown here is significantly lower than those calculated in FIG. 3B (98.9% reduction) and FIG. 4B (97.6% reduction). The advantages of the presently disclosed procedures 308 and 408, therefore, include significantly reduced emission level as well as the improved efficiency of the system to determine when to turn on the electrical heating in order to increase the temperature of either the particulate filter or the SCR system to achieve the reduced emission level.

Furthermore, electrically heated catalysts, or the aforementioned electrical heater application, is more effective than using an exhaust heater placed in the fluid path, e.g. a pipe, between the particulate filter and the SCR system. This exhaust heater enables the SCR system to be heated when the exhaust from the engine passes through the pipe. Specifically, the use of the electrical heating device implemented in a particulate filter or the SCR system lowers emissions and also lowers the energy consumption as compared to using the exhaust heater to heat the exhaust instead of the particulate filter or the SCR system. For example, when an exhaust heater is placed upstream of the SCR system and downstream of the particulate filter, the lowering of emissions is possible at the expense of using more power for the exhaust heater, thereby increasing the heater power consumption.

When the SCR system is heated using the electrical heating device implemented therein, the low emissions level is achieved using less energy consumption than the exhaust heater. The heat may be produced via induction heating or resistive heating. Furthermore, when the DOC, which is upstream of the particulate filter, is heated using the exhaust heater, the SCR system warms up slower from cold start and has as much power consumption as, if not more than, the application where the exhaust heater is positioned between the particulate filter and the SCR system. The electrically heated particulate filter can also assist in soot regeneration, both passive or active.

Although the examples and embodiments have been described in detail with reference to certain preferred embodiments, variations and modifications exist within the spirit and scope of the disclosure as described and defined in the following claims.

What is claimed is:

1. A vehicle system of a vehicle, the vehicle system comprising:
    an engine;
    on-board energy sources providing electrical energy, the on-board energy sources including an energy storage device and an electric machine;
    a particulate filter fluidly coupled with the engine and located downstream of the engine;
    an electrical heating device that is in direct contact with the particulate filter; and
    a controller operatively coupled with the engine, the on-board energy sources, and the electrical heating device, the controller configured to:
        detect, when the engine is turned off in an electric vehicle (EV) mode in which only the electric machine provides power to drive the vehicle, a predicted future increase in a vehicle power demand within a lookahead window;
        detect a temperature of the particulate filter upon detecting the predicted future increase in the vehicle power demand;
        in response to the detected temperature being below a lower temperature threshold, activate the electrical heating device using the on-board energy sources to increase the temperature of the particulate filter; and
        turn on the engine in response to the detected temperature being at or above the lower temperature threshold based on the predicted future increase in the vehicle power demand.

2. The vehicle system of claim 1, wherein the electrical heating device and the particulate filter are implemented in a common housing.

3. The vehicle system of claim 1, the controller further configured to deactivate, after the engine is turned on, the electrical heating device in response to detecting the temperature of the particulate filter being above an upper temperature threshold.

4. The vehicle system of claim 1, wherein the controller is configured to control the electrical heating device based on exhaust flow rate and exhaust temperature from the engine.

5. The vehicle system of claim 4, wherein the controller is configured to activate the electrical heating device at a higher power setting in response to detecting the exhaust flow rate is below a flow rate threshold and the exhaust temperature is below the lower temperature threshold.

6. The vehicle system of claim 1, wherein the controller is configured to detect that a state of charge (SOC) of the energy storage device is below a lower SOC threshold.

7. The vehicle system of claim 6, wherein the controller is configured to control the electrical heating device based on the SOC of the energy storage device.

8. The vehicle system of claim 1, wherein the particulate filter and a selective catalytic reduction (SCR) system are combined in a single component.

9. The vehicle system of claim 1, further comprising a selective catalytic reduction (SCR) system that is located downstream of the particulate filter.

10. A method of operating a vehicle system of a vehicle, the method comprising:
    detecting, by a controller of the vehicle system when an engine of the vehicle system is turned off in an electric vehicle (EV) mode in which only an electric machine provides power to drive the vehicle, a predicted future increase in a vehicle power demand within a lookahead window;

detecting, by the controller upon detecting the predicted future increase in the vehicle power demand, a temperature of a particulate filter fluidly coupled with the engine and located downstream of the engine;

in response to the detected temperature being below a lower temperature threshold, activating, by the controller, an electrical heating device that is in direct contact with the particulate filter using on-board energy sources to increase the temperature of the particulate filter, the on-board energy sources including an energy storage device and the electric machine; and turning on, by the controller, the engine in response to the detected temperature being at or above the lower temperature threshold to facilitate the predicted future increase in the vehicle power demand.

11. The method of claim 10, further comprising: deactivating, by the controller after the engine is turned on, the electrical heating device in response to detecting the temperature of the particulate filter being above an upper temperature threshold.

12. The method of claim 10, further comprising: controlling, by the controller, the electrical heating device based on exhaust flow rate and exhaust temperature from the engine.

13. The method of claim 12, further comprising:
detecting, by the controller, the exhaust flow rate being below a flow rate threshold and the exhaust temperature is below the lower temperature threshold; and
activating, by the controller, the electrical heating device at a higher power setting.

14. The method of claim 10, further comprising:
detecting that a state of charge (SOC) of the energy storage device coupled with the electric machine is below a lower SOC threshold.

15. The method of claim 14, further comprising: controlling, by the controller, the electrical heating device based on the SOC of the energy storage device.

16. The method of claim 10, wherein detecting the temperature of the particulate filter includes detecting the temperature of a selective catalytic reduction (SCR) system that is combined with the particulate filter in a single component.

17. The method of claim 10, further comprising: detecting a temperature of a selective catalytic reduction (SCR) system that is located downstream of the particulate filter.

18. A vehicle system of a vehicle, the vehicle system comprising:
an engine;
on-board energy sources providing electrical energy, the on-board energy sources including an energy storage device and an electric machine;
a particulate filter fluidly coupled with the engine;
an electrical heating device that is in direct contact with the particulate filter; and
a controller operatively coupled with the engine and the electrical heating device, the controller configured to:
predict, when the engine is turned off in an electric vehicle (EV) mode in which only the electric machine provides power to drive the vehicle, a future increase in a vehicle speed within a lookahead window;
detect a temperature of the particulate filter upon predicting the future increase in the vehicle speed;
activate the electrical heating device using the on-board energy sources in response to the detected temperature being below a lower temperature threshold; and
turn on the engine in response to the detected temperature being at or above the lower temperature threshold to increase the vehicle speed within the lookahead window.

19. The vehicle system of claim 1, wherein the predicted future increase in the vehicle power demand is determined based on a predicted future increase in a vehicle speed.

20. The method of claim 10, wherein the predicted future increase in the vehicle power demand is determined based on a predicted future increase in a vehicle speed.

* * * * *